(12) United States Patent
Ito

(10) Patent No.: US 12,124,111 B2
(45) Date of Patent: Oct. 22, 2024

(54) LENS ORDERING SYSTEM, LENS ORDERING METHOD, PROGRAM, AND DATA STRUCTURE

(71) Applicant: MITSUI CHEMICALS, INC., Tokyo (JP)

(72) Inventor: Shinsuke Ito, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 554 days.

(21) Appl. No.: 17/438,510

(22) PCT Filed: Mar. 10, 2020

(86) PCT No.: PCT/JP2020/010398
§ 371 (c)(1),
(2) Date: Sep. 13, 2021

(87) PCT Pub. No.: WO2020/184590
PCT Pub. Date: Sep. 17, 2020

(65) Prior Publication Data
US 2022/0146859 A1 May 12, 2022

(30) Foreign Application Priority Data
Mar. 14, 2019 (JP) .................. 2019-047275

(51) Int. Cl.
*A61B 3/00* (2006.01)
*G01M 11/02* (2006.01)
(Continued)

(52) U.S. Cl.
CPC ......... *G02C 7/027* (2013.01); *G01M 11/0235* (2013.01); *G02C 7/024* (2013.01);
(Continued)

(58) Field of Classification Search
CPC ... G01M 11/0235; G02C 7/027; G02C 7/024; G02C 7/10; G02C 7/104; G02C 2202/06; G06Q 30/0621
(Continued)

(56) References Cited

U.S. PATENT DOCUMENTS

2002/0027638 A1 3/2002 Thakrar et al.
2002/0044254 A1 4/2002 Saathoff
(Continued)

FOREIGN PATENT DOCUMENTS

EP 2657304 A1 10/2013
JP H0354519 A 3/1991
(Continued)

*Primary Examiner* — Mahidere S Sahle
(74) *Attorney, Agent, or Firm* — BUCHANAN, INGERSOLL & ROONEY PC

(57) ABSTRACT

A lens ordering system includes: a computer, the computer being provided with a CPU, a storage unit, and a selection unit that is configured to be controlled by the CPU. The storage unit stores data, configured to enable determination of lens information that includes a resin material type, a pigment type, and a coating type that are used for a lens material, based on user information that includes basic information pertaining to a user, and at least one of usage information pertaining to lens usage desired by the user or psychosomatic information including psychosomatic symptoms and conditions including the eyes of the user. The selection unit determines and outputs the lens information based on the user information acquired pertaining to the user and the data stored in the storage unit.

6 Claims, 14 Drawing Sheets

(51) Int. Cl.
  *G02C 3/00* (2006.01)
  *G02C 7/00* (2006.01)
  *G02C 7/02* (2006.01)
  *G02C 7/10* (2006.01)
  *G06N 3/08* (2023.01)
  *G06Q 30/0601* (2023.01)
(52) U.S. Cl.
  CPC .................. *G02C 7/10* (2013.01); *G06N 3/08* (2013.01); *G06Q 30/0621* (2013.01); *G02C 7/104* (2013.01); *G02C 2202/06* (2013.01)
(58) Field of Classification Search
  USPC .............. 351/159.24, 159.3, 159.62, 159.65, 351/159.66, 159.74, 204, 246; 359/355
  See application file for complete search history.

(56) References Cited

U.S. PATENT DOCUMENTS

| | | |
|---|---|---|
| 2004/0215525 A1 | 10/2004 | Keane et al. |
| 2008/0033836 A1 | 2/2008 | Shinoara et al. |
| 2010/0296055 A1 | 11/2010 | Esser et al. |
| 2015/0212343 A1 | 7/2015 | Fonte et al. |
| 2015/0370094 A1 | 12/2015 | Hashimoto et al. |
| 2016/0216407 A1 | 7/2016 | Kojima et al. |
| 2016/0223839 A1 | 8/2016 | Kakinuma et al. |
| 2017/0371178 A1 | 12/2017 | Crespo et al. |
| 2017/0371179 A1 | 12/2017 | Scherlen et al. |
| 2019/0153146 A1 | 5/2019 | Kakinuma et al. |
| 2019/0212581 A1 | 7/2019 | Scherlen et al. |
| 2019/0355168 A1* | 11/2019 | Zimanyi .................. G02B 7/04 |

FOREIGN PATENT DOCUMENTS

| | | |
|---|---|---|
| JP | 2000325840 A | 11/2000 |
| JP | 2010517088 A | 5/2010 |
| JP | 2016537716 A | 12/2016 |
| WO | 2012057096 A1 | 5/2012 |
| WO | 2014133111 A1 | 9/2014 |
| WO | 2015037627 A1 | 3/2015 |
| WO | 2015037628 A1 | 3/2015 |
| WO | 2016113506 A1 | 7/2016 |
| WO | 2017/047684 A1 | 3/2017 |
| WO | 2017194898 A1 | 11/2017 |

* cited by examiner

LENS ORDERING SYSTEM, LENS ORDERING METHOD, PROGRAM, AND DATA STRUCTURE

TECHNICAL FIELD

The present disclosure relates to a lens ordering system, a lens ordering method, a program, and a data structure.

BACKGROUND ART

Conventionally, there exists a technology in Japanese Patent Application Laid-Open 2000-325840 relating to a system for coloring lenses on the basis of coloring information about lens coloring.

SUMMARY OF INVENTION

Technical Problem

Lenses should be treated by selecting appropriate materials, pigments, and coatings to suit the usage and psychosomatic conditions of a user who will wear eyeglasses incorporating the lenses. For example, it has been suggested that light emitted by digital device displays (for example, light with a wavelength around 460 nm) causes eye strain and the like, and is considered to be undesirable light for the human body. A lens treatment to shield such light that is undesirable for the human body is preferably performed. Lens treatments that meet the needs of users suffering from eye strain and the like are a societal issue that is necessary to improve their so-called quality of life.

Lens treatments involve technologies that afford lenses specific pigments and thicknesses, and that cut out specific wavelengths.

For example, in International Publication WO2014-133111, a lens treatment that provides so-called blue light cut is proposed as a lens treatment that takes into account psychosomatic conditions such as cases where eye fatigue or pain associated with the use of displays and the like arise. In addition, lens treatments that take into account the prevention of eye disorders (such as age-related macular degeneration) have been proposed.

Furthermore, International Publication WO2015-37628 proposes a lens treatment for maintaining normal circadian rhythms. With regard to sleep disorders, lens treatments for suppressing the inhibition of melatonin secretion caused by light exposure at night have been proposed.

In addition, International Publication WO2015-37627 proposes a lens treatment that prevents and suppresses migraine headaches. Lens treatments for suppressing pupil light reflection that can be used for night driving and other usages have been proposed.

As mentioned hereinabove, there are a wide variety of factors to be considered in a lens treatment, and it is difficult to determine how a lens treatment should be carried out by taking all of these factors into account. A system for supporting or proposing lens treatments is therefore required.

The problem of the present disclosure is to provide a lens ordering system, a lens ordering method, a program, and a data structure that, by taking a plurality of items into account, enable recommended lens information to be presented to a user.

Solution to Problem

A lens ordering system of the present disclosure includes: a computer, the computer being provided with a CPU, a storage unit, and a selection unit that is configured to be controlled by the CPU, wherein: the storage unit stores data, configured to enable determination of lens information that includes a resin material type, a pigment type, and a coating type that are used for a lens material, based on user information that includes basic information pertaining to a user, and at least one of usage information pertaining to lens usage desired by the user or psychosomatic information including psychosomatic symptoms and conditions including the eyes of the user, and
the selection unit determines and outputs the lens information based on the user information acquired pertaining to the user and the data stored in the storage unit.

In addition, in the lens ordering system of the present disclosure, wherein: the computer further includes an acquisition unit, and, the acquisition unit is capable of acquiring, via an input, at least one of the usage information or the psychosomatic information from the user information, in a predetermined order.

In addition, in the lens ordering system of the present disclosure, wherein: the data is a learned model that is trained in advance so as to output the lens information from the user information that includes at least one of the usage information or the psychosomatic information, and is a learned model in which weighting parameters of a neural network model are learned by a deep learning technique by using, as learning data, weights for each of the usage information and the psychosomatic information and correct answer data for the material type, the pigment type, and the coating type of the lens, and the selection unit determines the lens information that is output from the learned model by taking, as an input to the learned model, the user information acquired pertaining to the user.

In addition, in the lens ordering system of the present disclosure, wherein: the computer further includes a collection unit, the collection unit collects, via a network, the user information pertaining to the user, which is input to a terminal, and records the user information in the storage unit, and the selection unit determines the lens information pertaining to the user by matching the user information pertaining to the user recorded in the storage unit with the data recorded in the storage unit.

Furthermore, lens ordering method of the present disclosure that causes a computer to execute processing, the processing comprising: determining and outputting lens information based on user information acquired pertaining to a user, and data configured to enable determination of the lens information based on user information that is stored in a storage unit of the computer and that includes basic information pertaining to a user, and at least one of usage information pertaining to lens usage desired by the user or psychosomatic information including psychosomatic symptoms and conditions including the eyes of the user, the lens information including a resin material type, a pigment type, and a coating type that are used for a lens material.

In addition, a program of the present disclosure is that, in a lens ordering system provided with a storage unit and a selection unit, causes a computer to: function as the selection unit that determines and outputs lens information based on user information acquired pertaining to a user, and data configured to enable determination of the lens information based on the user information, which is stored in a storage unit of the computer and includes basic information pertaining to a user, and at least one of usage information pertaining to lens usage desired by the user or psychosomatic information including psychosomatic symptoms and conditions including the eyes of the user, the lens information including a resin material type, a pigment type, and a coating type that are used for a lens material.

In addition, a data structure of the present disclosure is that includes user information and that is used by a lens ordering system having a storage unit, a selection unit, and a display unit wherein the system performs processing comprising determining information pertaining to a lens treatment, the data structure including user information that includes basic information pertaining to a user, and at least one of usage information pertaining to lens usage desired by the user or psychosomatic information including psychosomatic symptoms and conditions including the eyes of the user, the lens information including a resin material type, a pigment type, and a coating type that are used for a lens material, wherein: the storage unit pre-stores data configured to enable determination of the lens information based on the user information, in a case in which the user information acquired pertaining to the user is input to the selection unit, the selection unit is configured to determine the lens information based on the data stored in the storage unit, and the display unit is configured to output the lens information determined by the selection unit.

Advantageous Effects of Invention

A lens ordering system, a lens ordering method, the program, and a data structure of the present disclosure afford the advantageous effect of enabling, by taking a plurality of items into account, recommended lens information to be presented to a user.

DESCRIPTION OF EMBODIMENTS

The present embodiment will be described in detail hereinbelow. A lens ordering device according to the present embodiment outputs recommended lens information on the basis of inputted user information about a user. Note that the user according to the present embodiment is a customer who is trying to purchase custom order lenses at an optician's shop, for example.

<System Configuration According to First Embodiment>

Figure 1:
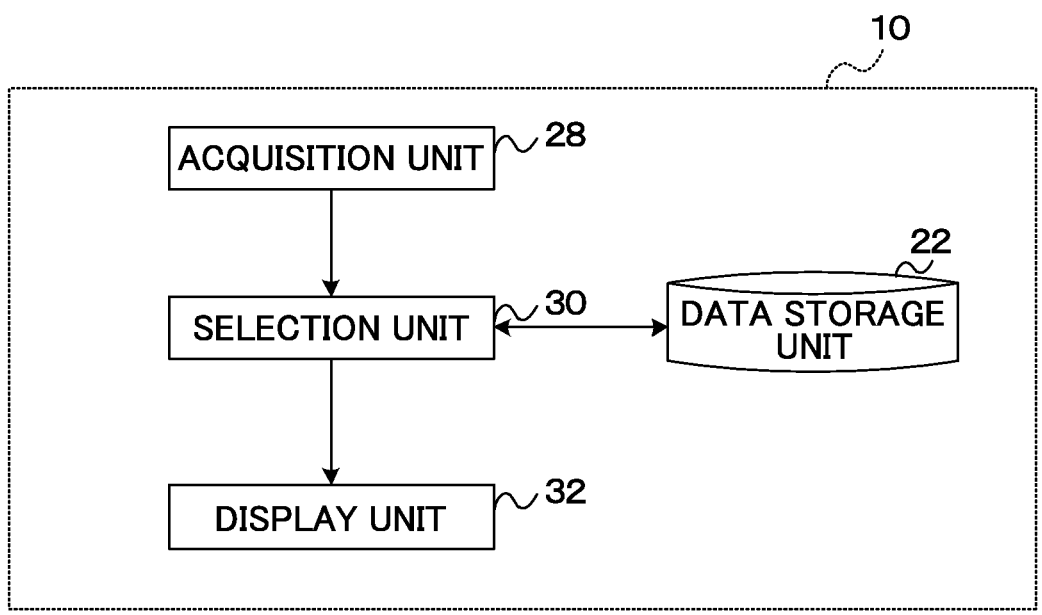
FIG. 1 is a block diagram illustrating an example of a system configuration of a lens ordering device according to a first embodiment.

FIG. 1 is a block diagram illustrating an example of a system configuration of a lens ordering device 10 according to a first embodiment. The lens ordering device 10 of the configuration illustrated in FIG. 1 can be configured from a computer that includes a CPU, a RAM, a ROM that stores various data and a program for executing processing routines (described subsequently). The lens ordering device 10 is an example of a lens ordering system.

Figure 2:
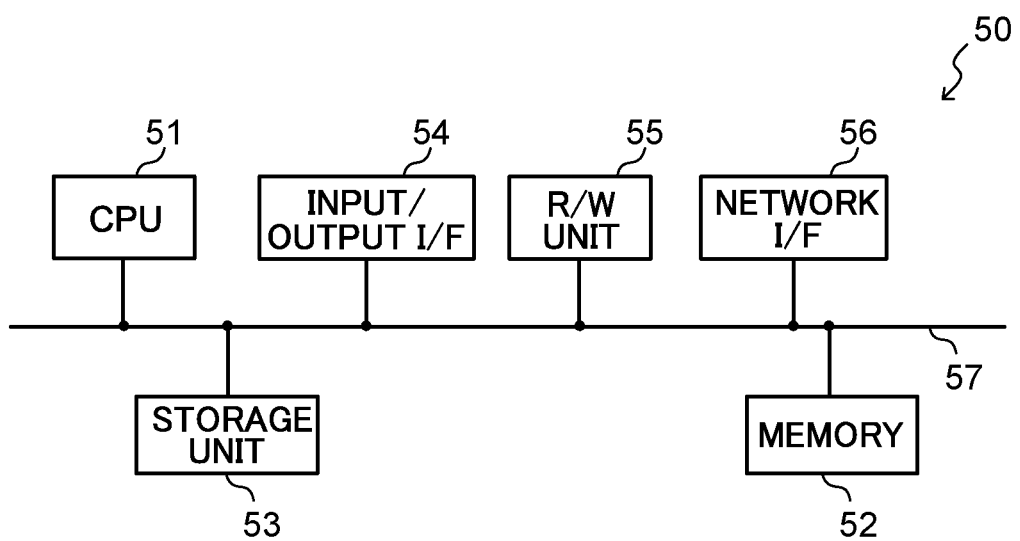
FIG. 2 is a schematic block diagram of a computer that functions as the lens ordering device according to the present embodiment.

For example, the lens ordering device 10 can be implemented by a computer 50, which is illustrated in FIG. 2. The computer 50 is provided with a CPU 51, a memory 52 serving as a temporary storage region, and a nonvolatile storage unit 53. Furthermore, the computer 50 is provided with an input/output interface (I/F) 54 to which an input/output device or the like (not illustrated) is connected, and a read/write (R/W) unit 55 that controls the reading and writing of data from/to a recording medium. In addition, the computer 50 is provided with a network I/F 56 that is connected to a network such as the internet. The CPU 51, the memory 52, the storage unit 53, the input/output IN 54, the R/W unit 55, and the network I/F 56 are connected to one another via a bus 57.

The storage unit 53 can be implemented by a hard disk drive (HDD), a solid state drive (SSD), or a flash memory, or the like. A program that causes the computer 50 to function is stored in the storage unit 53, which serves as a storage medium. The CPU 51 reads the program from the storage unit 53, expands the program in the memory 52, and sequentially executes the processes that the program includes.

An example of the electrical configuration of the computer in FIG. 2 has been described hereinabove.

Each processing unit in the lens ordering device 10 of FIG. 1 is described hereinbelow. Functionally, the lens ordering device 10 is provided with a data storage unit 22, an acquisition unit 28, a selection unit 30, and a display unit 32, as illustrated in FIG. 1.

The data storage unit 22 stores a learned model that takes user information as an input and outputs lens information. The user information includes basic information, usage information, and psychosomatic information. The basic information is information such as degree counts corresponding to the eyesight of a user, astigmatism, age, gender, prescription, and frame type, and so forth. The usage information is information about the type of lens usage desired by the user, such as "Driving", "Sport", "Business task (PC work)", and so forth, for example. Psychosomatic information is information that includes symptoms and conditions of the body and mind of the user, including the eyes, such as "Cataract", "Migraine", "Eye strain", and so forth, for example. The lens information includes a resin material type, a pigment type, a coating type, and the like, which are used for the lens material. The types of resin materials include, for example, polyurethane, acrylate, and polyolefin, and the like. Examples of the types of pigments include, for example, Tinuvin 326 (manufactured by BASF Japan Ltd.), FDB series such as FDB-001 (manufactured by Yamada Chemical Industry Co., Ltd.), FDG series such as FDG-001 (manufactured by Yamada Chemical Industry Co., Ltd.), FDR series such as FDR-001 (manufactured by Yamada Chemical Industry Co., Ltd.), and the like. The types of coatings include, for example, a primer layer, a hard coat layer, an antireflective layer, an antifogging coating layer, an anti-stain layer, and a water-repellent layer, as coating layers. By combining these types of materials, pigments, and coatings, it is possible to output lens information according to the usage information and psychosomatic information. For example, as disclosed in Patent Literature 2 and so forth, the lens information is for treatments to cut blue light wavelengths, prevent eye disorders such as age-related macular degeneration, sleep disorders, and suppress pupillary reflexes. The lens information further includes information about lens staining properties, and information about resin solubility, which indicates the compatibility of a specific pigment with a specific resin. Information about the staining properties of the lens is, for example, information denoting the color scheme, density, and tone of the lens, or the like, which corresponds to a color swatch of the colored lens according to the resin type of the lens. By including such information about the staining properties, feedback can be provided in cases where the usage for which the lens is to be dyed, or options, are designated, and so forth. Information about resin solubility, which indicates the compatibility of a specific pigment with a specific resin, is information that expresses a relationship, for example, where a certain pigment has the property of not dissolving in a certain resin monomer. By including such information about solubility, feedback can be provided in such cases as where a specific pigment is required according to symptoms. Note that the foregoing lens information is for illustrative purposes only.

For model learning, the weighting parameters of the neural network model may be learned using deep learning techniques, by using, as learning data, the weights of each of the usage information and psychosomatic information, and correct answer data for the material type, the pigment type, and the coating type, and the like, of the lens. Any technique can be used as the deep learning technique, such as GAN (Generative Adversarial Network) or LSTM (Long Short-Term Memory).

Figure 3:
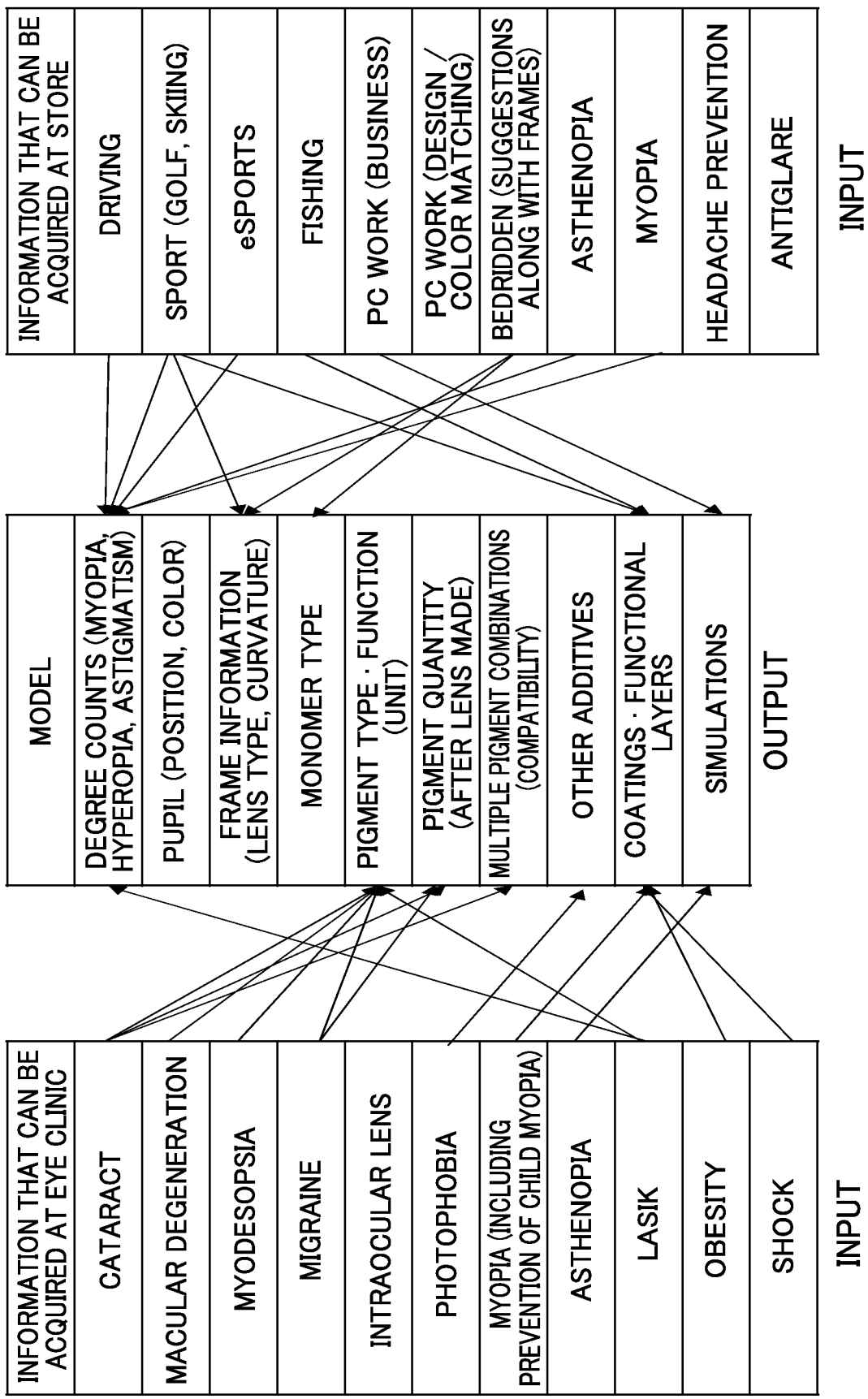
FIG. 3 is a diagram illustrating an example of input and output images of a model.

FIG. 3 is a diagram illustrating an example of input and output images of a model. As illustrated in FIG. 3, the input user information can be divided into elements of information that can be acquired from a consultation at an eye clinic, and elements of information that can be acquired through questionnaires for users at stores. As illustrated in FIG. 3, each of the elements of the input may be adjustment parameters for a plurality of output elements. For example, in a case where the information from the eye clinic indicates a diagnosis of "migraine" due to the eyes being affected, an element such as "migraine" as the psychosomatic information of the input will affect the parameters of the "pigment type and function" and "pigment quantity" elements as the pigment type. The "pigment type and function" and "pigment quantity" elements learn model weights so as to adjust to parameters that will alleviate the "migraine". By using the learned model that has been learned in this way, in a case where an input that includes "migraine" as the psychosomatic information in the user information is received, the learned model is capable of outputting the pigment type that corresponds to "migraine". Because the model has a plurality of input elements, the model is trained to adjust the impact of each of the input elements. For example, the model is trained by defining priorities and weighting parameters for the elements of learning data inputs. The priorities and weighting parameters are adjusted based on the lens information that the user has ultimately selected. Furthermore, based on information obtained from a questionnaire or the like for a user in a store, for example, it may be determined that the "headache" symptom of the user will very likely be a photophobic migraine. In that case, a diagnosis by an ophthalmologist may be encouraged in the output of the learned model, and the same processing may be performed as in a case where the learned model outputs a pigment type that corresponds to "migraine" based on the above-described eye clinic information.

Note that data in a table format in which each combination of user information and lens information is recorded may also be stored in the data storage unit 22 instead of the learned model. In this case, rules for the output elements that correspond to the combinations of each of the input elements may be stored as items affording adjustments for the combinations.

The data storage unit 22 also has a customer database in which the history of the basic information of the acquired user information is recorded. The lens information which is ultimately determined is also recorded in the customer database.

The acquisition unit 28 acquires, via an input, at least one of the usage information and the psychosomatic information of the user information, in a predetermined order. In a case where there is no basic information among the user information of the user, the acquisition unit 28 acquires the prerequisite basic information about the user and records the information in the customer database of the data storage unit 22.

Figure 4:
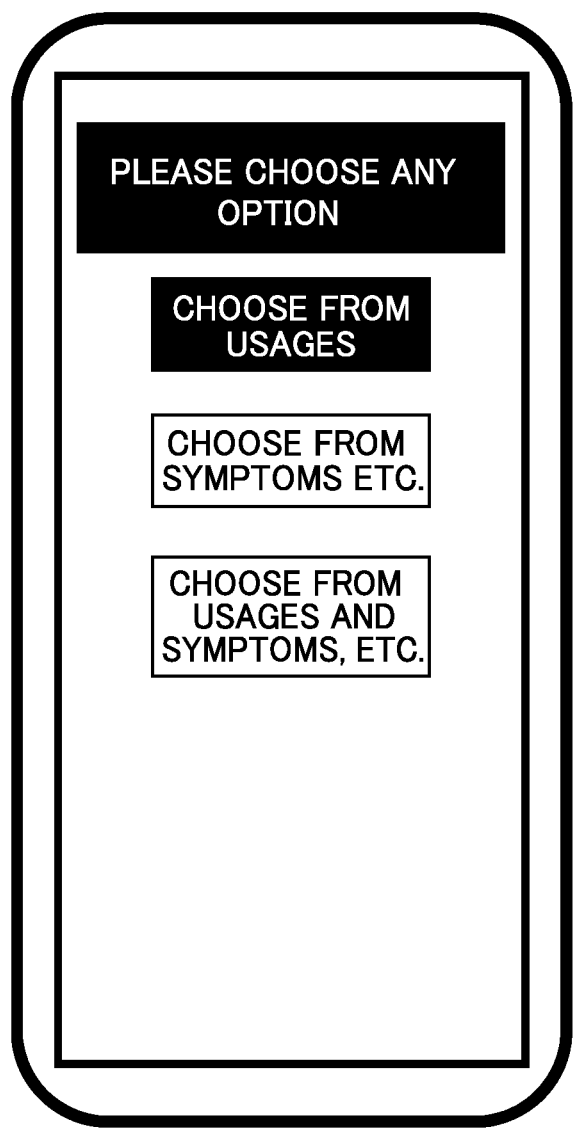
FIG. 4 is a diagram illustrating an example of an input interface screen of an acquisition unit.
Figure 5:
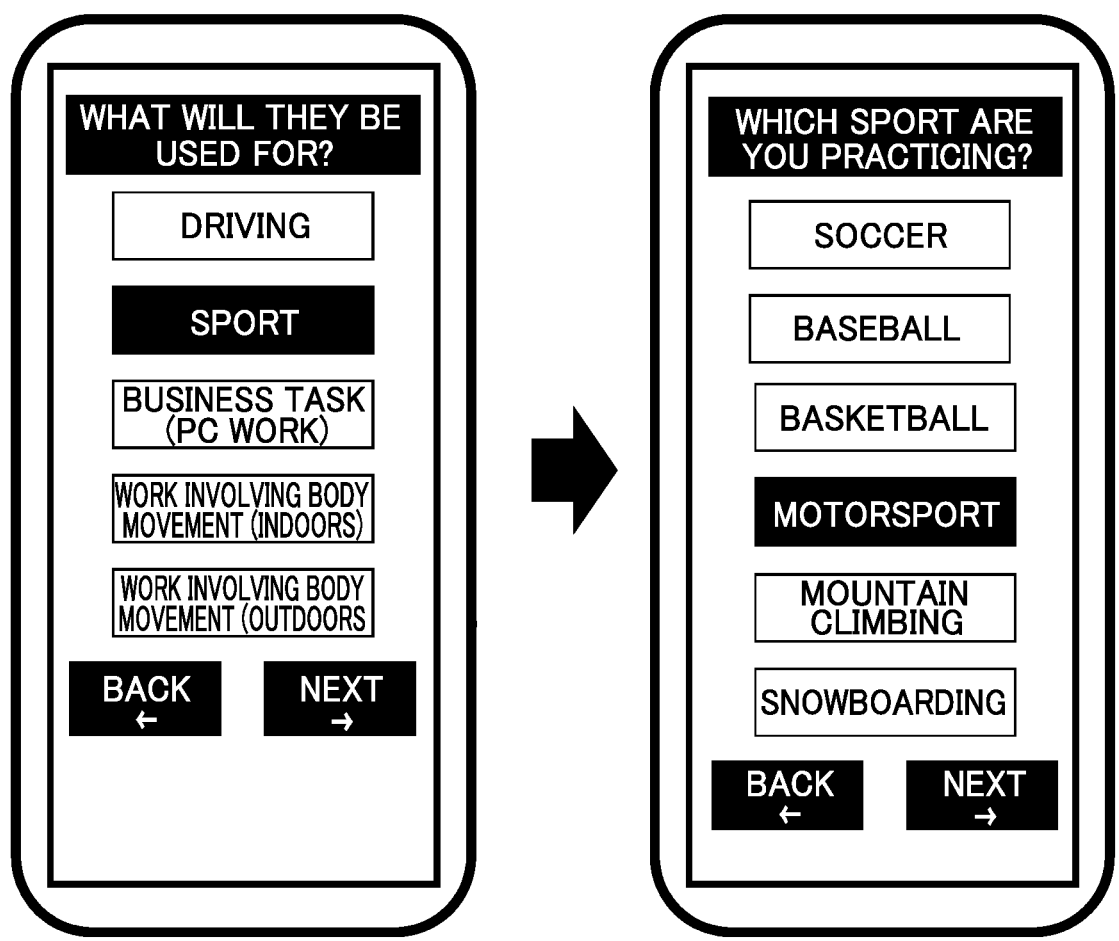
FIG. 5 is a diagram illustrating an example of an input interface screen of the acquisition unit.
Figure 6:
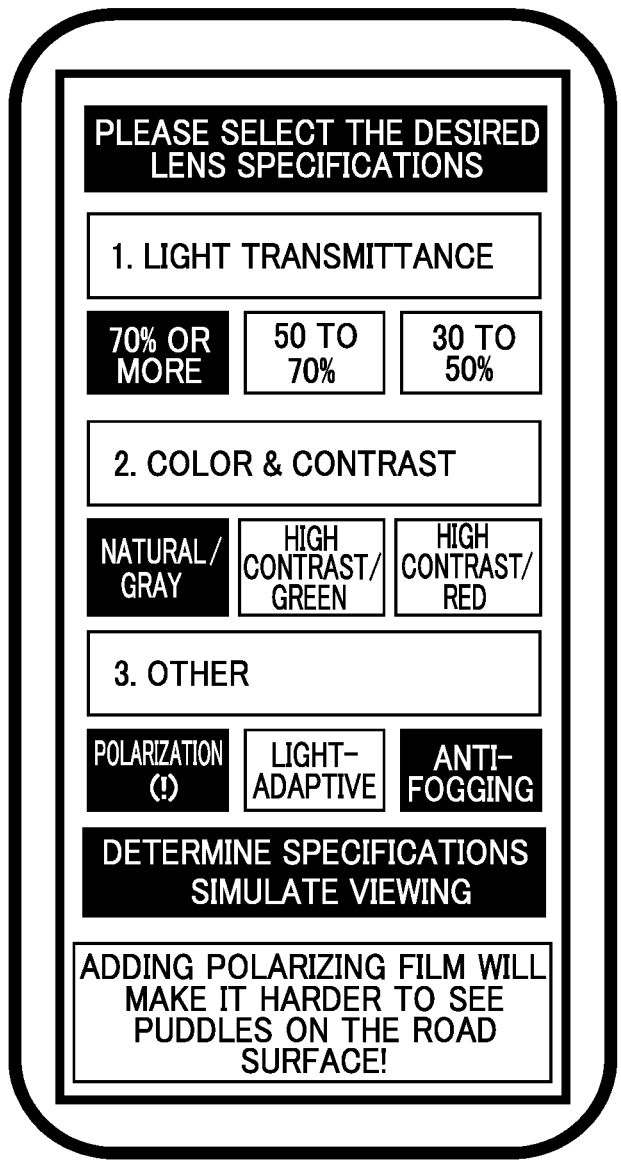
FIG. 6 is a diagram illustrating an example of an input interface screen of the acquisition unit.

FIGS. 4 to 6 are diagrams illustrating an example of input interface screens of the acquisition unit 28. As illustrated in FIGS. 4 to 6, the interface of the acquisition unit 28 is an interface such as a touch panel that enables the user to input each item. On the interface screen illustrated in FIG. 4, either "Usage", "Symptoms, etc.", or "Usage, symptoms, etc." is selected. When the user selects "Usage", for example, the processing then shifts to the interface screen illustrated on the left in FIG. 5. The interface screen illustrated in FIG. 5 receives, as the usage, a selection of the usage type, such as "Driving", "Sport", "Business task (PC work)", or the like, which are major items. When the user selects, for example, "Sport" and then touches "Next", the processing shifts to the next interface screen. The next interface screen receives the selection of details for medium and small items of the "Sport" usage type. When the details of the usage type are selected on the next interface screen on the right of FIG. 5 and then "Next" is touched, the processing then shifts to the interface screen illustrated in FIG. 6. On the interface screen illustrated in FIG. 6, lens specification options are selected. As illustrated in FIG. 6, the selection of "Light Transmittance", "Color & Contrast", and "Other", for example, are received as options. Annotations are also displayed according to the selection. For example, selecting "Polarization" will display an annotation such as "Adding polarizing film will make it harder to see puddles on the road surface." In addition, a selection of blue light cut, hard coating, water repellent, photochromic, or the like, may also be received as coating specifications. Further, as illustrated in FIG. 6, when "determine specifications, simulate viewing performance" is touched, a simulation of the viewing performance is performed after the processing of the selection unit 30 has been executed. Examples of simulations include appearance or viewing performance. Appearance, for example, displays the appearance of the user or an avatar wearing eyeglasses equipped with lenses based on the lens information. In a case where the user has entered frame information, the appearance of the combination of lens and frame based on the lens information, or the appearance of the user or avatar wearing the eyeglasses resulting from the combination of the lens and frame, is displayed. Viewing performance, for example, displays an image or video on the display that the user is operating, and displays the difference in the viewing performance of the user when using lenses based on the lens information and when not using the lenses. The image or video is saved or taken beforehand. In this case, the user may switch, on the operating screen, between the case where the lens based on the lens information is used and the case where the lens is not used to compare the viewing performance, or the user may compare the viewing performance by placing both cases side by side on the same screen.

Figure 7:
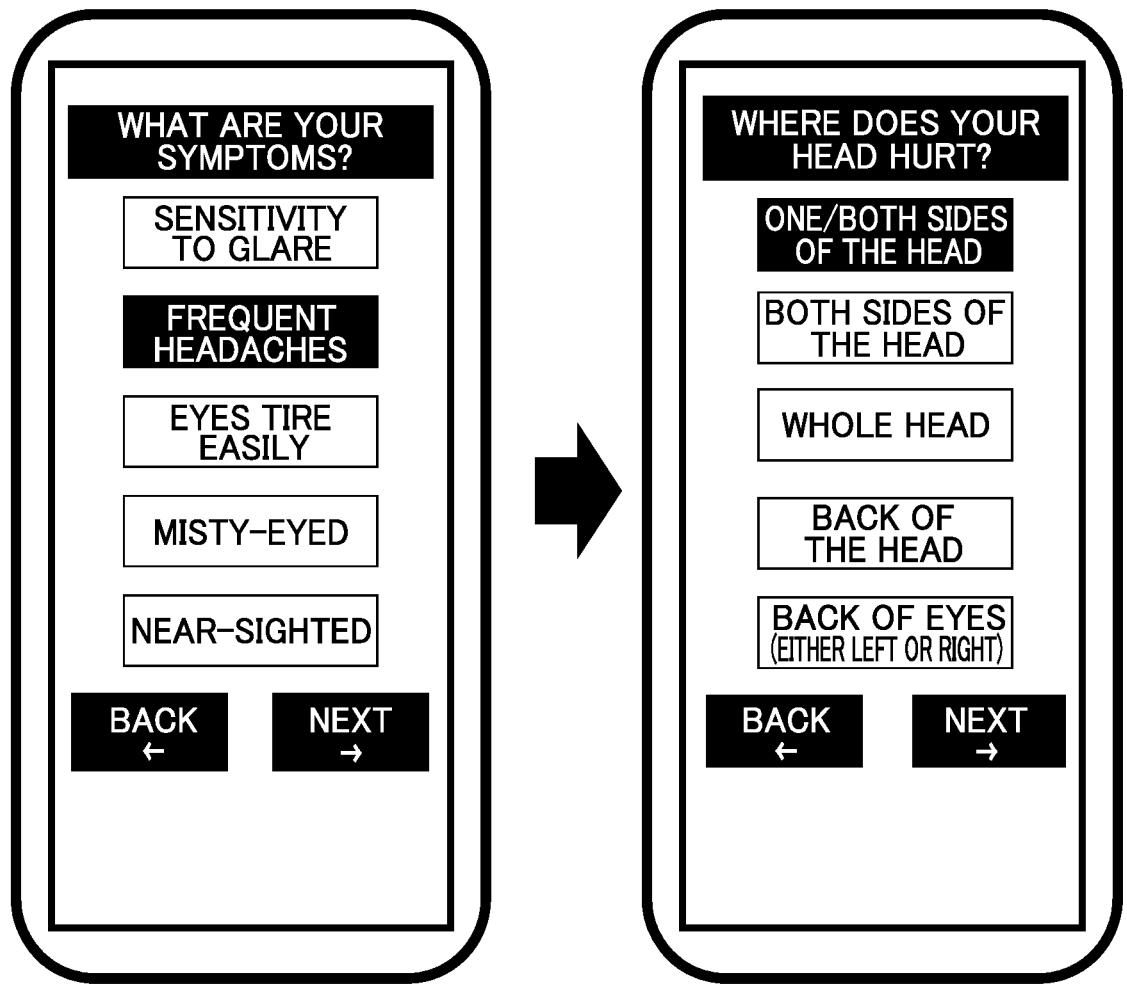
FIG. 7 is a diagram illustrating an example of an input interface screen in a case where symptom inputs are received in the acquisition unit.
Figure 8:
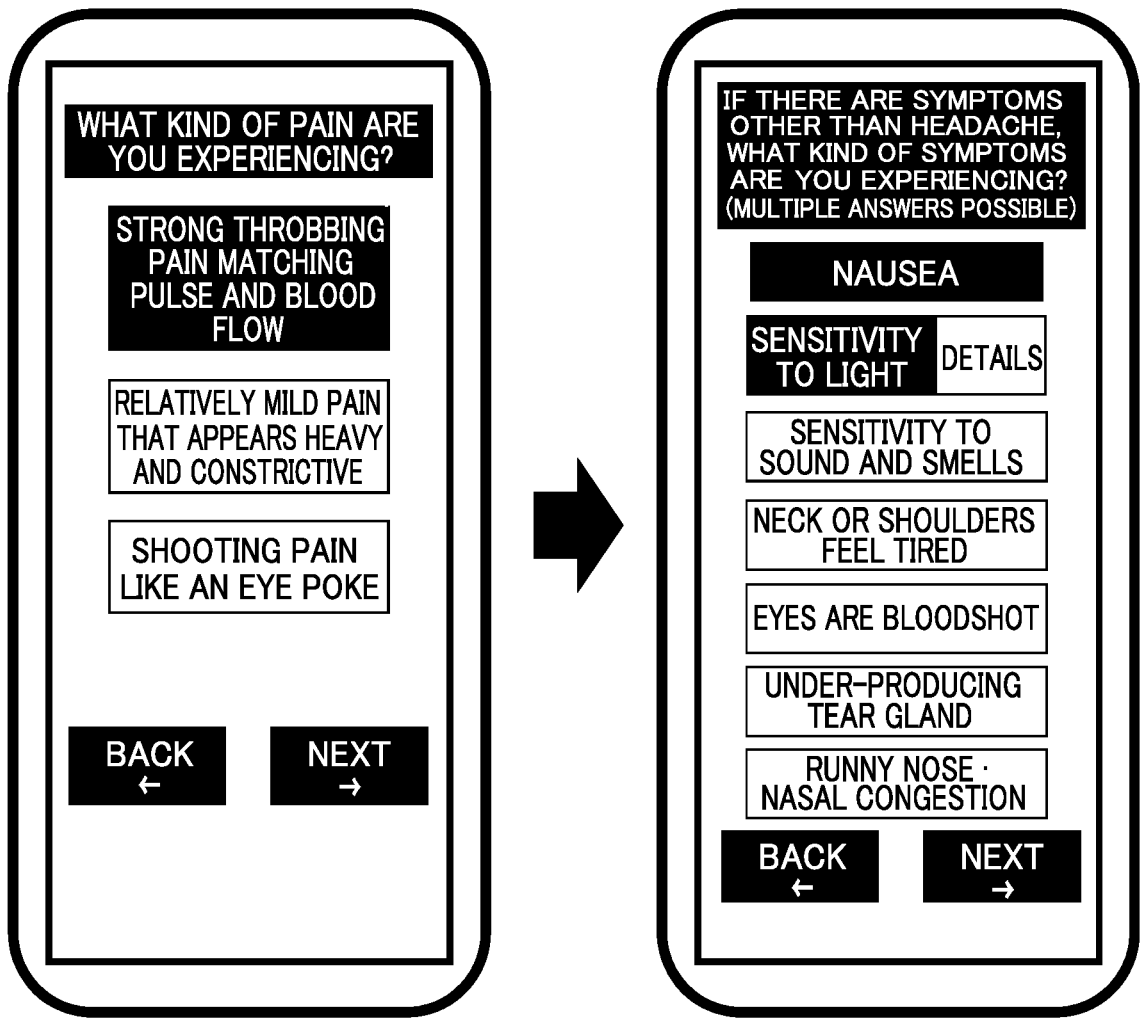
FIG. 8 is a diagram illustrating an example of an input interface screen in a case where symptom inputs are received in the acquisition unit.
Figure 9:
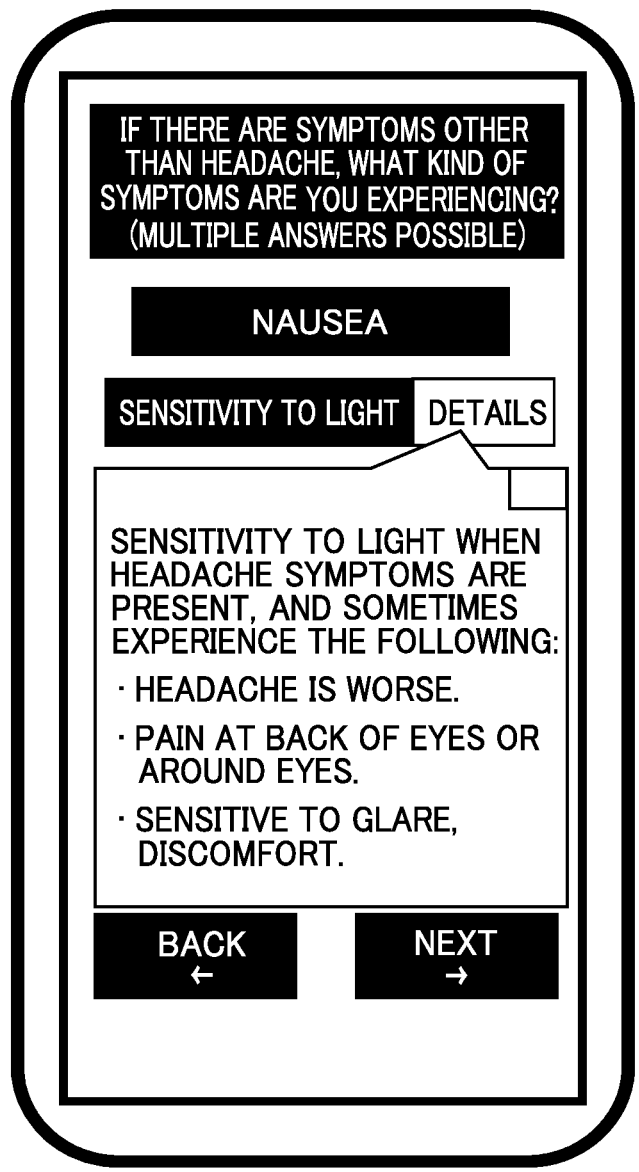
FIG. 9 is a diagram illustrating an example of an input interface screen in a case where symptom inputs are received in the acquisition unit.
Figure 10:
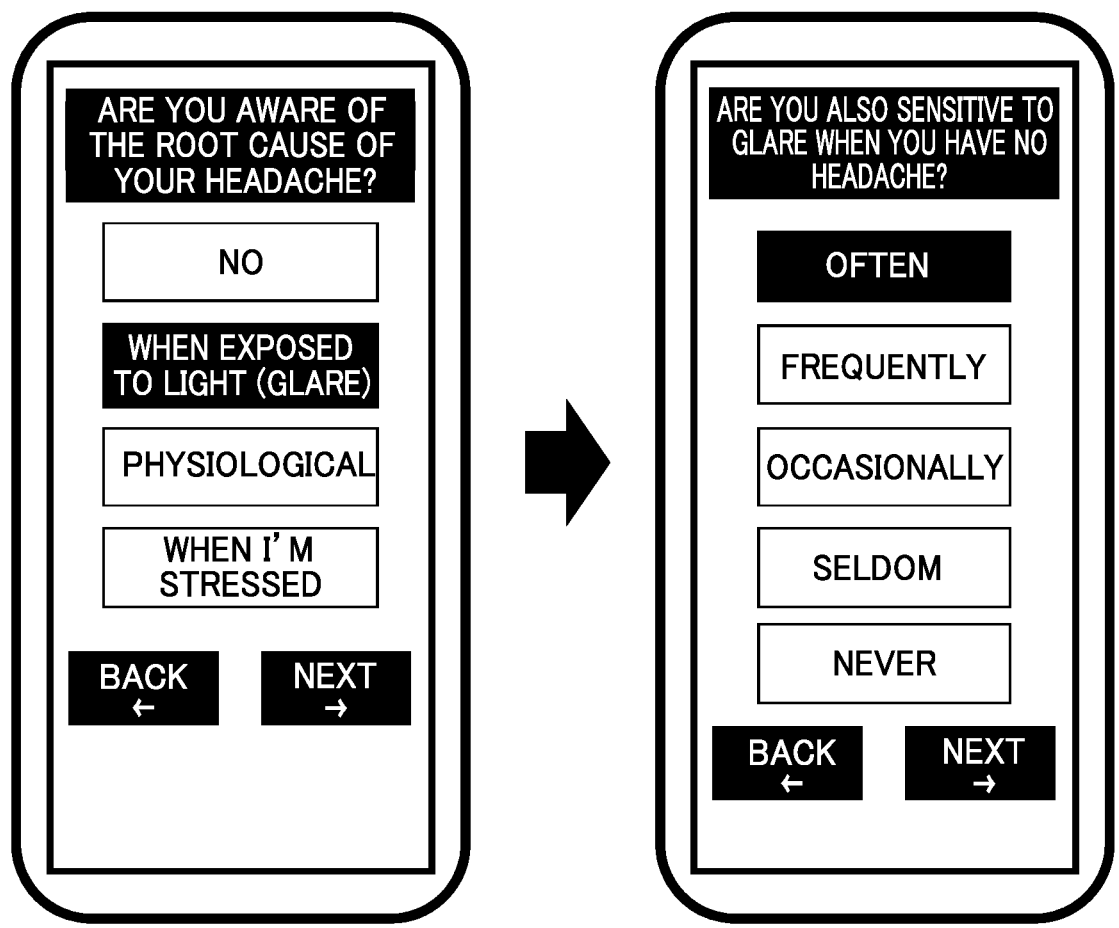
FIG. 10 is a diagram illustrating an example of an input interface screen in a case where symptom inputs are received in the acquisition unit.
Figure 11:
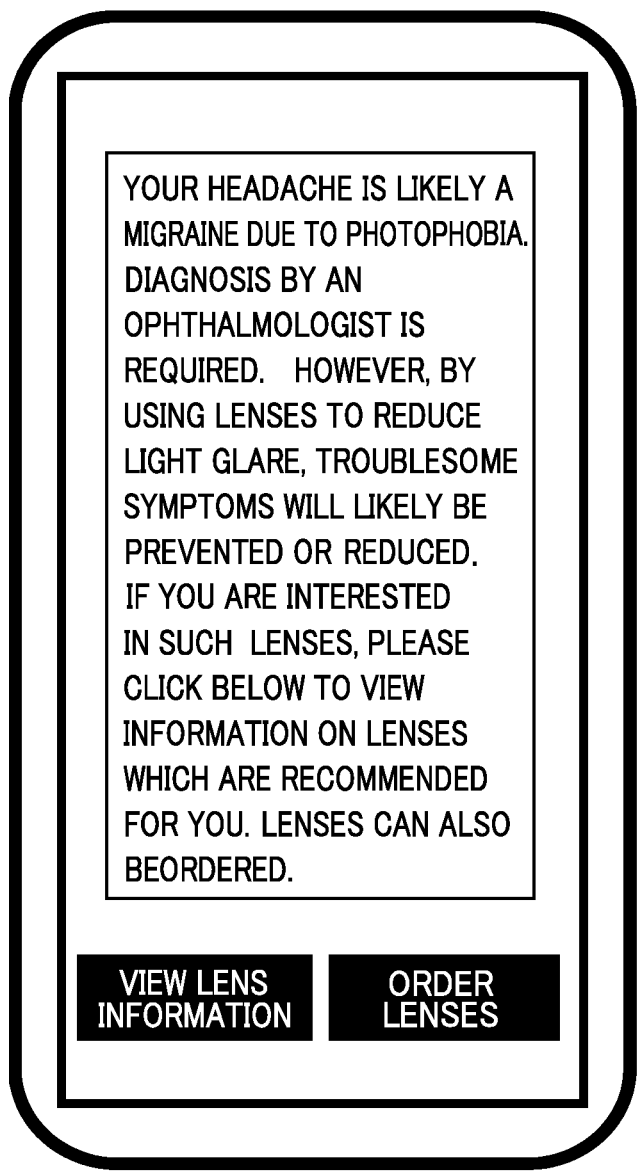
FIG. 11 is a diagram illustrating an example of an input interface screen in a case where symptom inputs are received in the acquisition unit.

FIGS. 7 to 11 are diagrams illustrating an example of input interface screens in a case where symptom inputs are received in the acquisition unit 28. For example, in FIG. 4, when the user selects, for example, "Symptoms, etc.", selection items for symptoms are displayed next, as illustrated in FIG. 7. The interface screen illustrated on the left of FIG. 7 receives, as symptoms, the selection of symptom types such as "Sensitive to glare," "Frequent headaches," "Eyes tire easily," or the like. When the user selects, for example, "Frequent headaches" and then touches "Next", the processing shifts to the next interface screen illustrated on the right in FIG. 7. Because the selection corresponds to the user symptom "headache," a case where the symptom is a headache will be described by way of example hereinbelow. The interface screen illustrated on the right in FIG. 7 receives, as a symptom location, the selection of a location such as "One/both sides of the head," "Both sides of the head," or "The whole head". When the user selects, for example, "Frequent headaches" and then touches "Next", the processing shifts to the next interface screen illustrated on the left in FIG. 8. The interface screen illustrated on the left in FIG. 8 receives, as a symptom condition, the selection of a symptom condition such as "Strong throbbing pain matching pulse and blood flow" or "Relatively mild pain that appears heavy and constrictive". When the user selects, for example, "Strong throbbing pain that matches pulse and blood flow," and then touches "Next," the processing shifts to the next interface screen illustrated on the right in FIG. 8. The interface screen illustrated on the right in FIG. 8 receives, as related symptoms, a plurality of possible selections of related conditions such as "Nausea" and "Sensitivity to light". Related symptoms sometimes include details, and on the right side of FIG. 8, a "Details" button is attached to the "Light Sensitive" selection item. As illustrated in FIG. 9, pressing the "Details" button will display the details of the related symptoms in a pop-up (or a separate screen). When the user selects, for example, "Frequent headaches" and then touches "Next", the processing shifts to the next interface screen. The next interface screen displays selection items for choosing symptom conditions. When the user selects an optional selection item and touches "Next", the processing shifts to the next interface screen illustrated on the left in FIG. 10. The interface screen illustrated on the left of FIG. 10 receives, as answers relating to the root cause of symptoms, the selection of a known root cause of symptoms such as "None", and "When sensing light (glare)". When the user selects, for example, "When exposed to light (glare)," and then touches "Next," the processing shifts to the next interface screen illustrated on the right in FIG. 10. The interface screen illustrated on the left in FIG. 10 receives, as subjective symptoms related to the selected root cause, the selection of a subjective symptom related to the root cause such as "Often" or "Frequently". When the user selects an optional subjective symptom and touches "Next", the processing shifts to the next interface screen illustrated in FIG. 11. The interface screen illustrated on the left in FIG. 10 displays the results of a determination regarding the symptoms, as well as lens information and guidance for lens ordering. FIG. 11 is an example of a case where, as a result of the above-described selections, the fact that there is a likelihood of photophobic migraine is displayed as a determination result.

As mentioned hereinabove, the order in which the acquisition unit 28 receives data is set such that a hierarchy of major and medium/small items are provided for usage, and a lower level is selected by choosing an upper level. Furthermore, the order in which the step-by-step data selection is received is set according to the symptoms, the results of symptom diagnosis are displayed, and, depending on the selection, the user is encouraged via the diagnostic results to visit an ophthalmologist. The above interface screens are the same in a case where basic information, and psychosomatic information such as symptoms, are acquired. The acquisition unit 28 also receives lens specifications as options. The output is fixed for lens specifications that have been selected as options. Note that the hierarchy may be designed appropriately by taking into account the above-described priority rankings and weights, and so forth.

The selection unit 30 determines the lens information outputted from the learned model by using the user information acquired by the acquisition unit 28 as an input to the learned model stored in the data storage unit 22. The selection unit 30 executes a simulation using the determined lens information. The selection unit 30 causes the display unit 32 to display the simulated results. When the simulated results are OK, the selection unit 30 outputs the final lens information to the display unit 32, and when the results are NG, the processing returns to the acquisition of user information by the acquisition unit 28. When the user information, which is the basic information, usage information, and psychosomatic information, is inputted to the learned model, the recommended lens information is outputted according to the weighting parameters of the neural network of the learned model.

The display unit 32 outputs the simulated results of the lens information by the selection unit 30. The display unit 32 outputs the lens information which is ultimately determined by the selection unit 30, the acquired user information, and the simulated results.

<Action According to First Embodiment>

Figure 12:
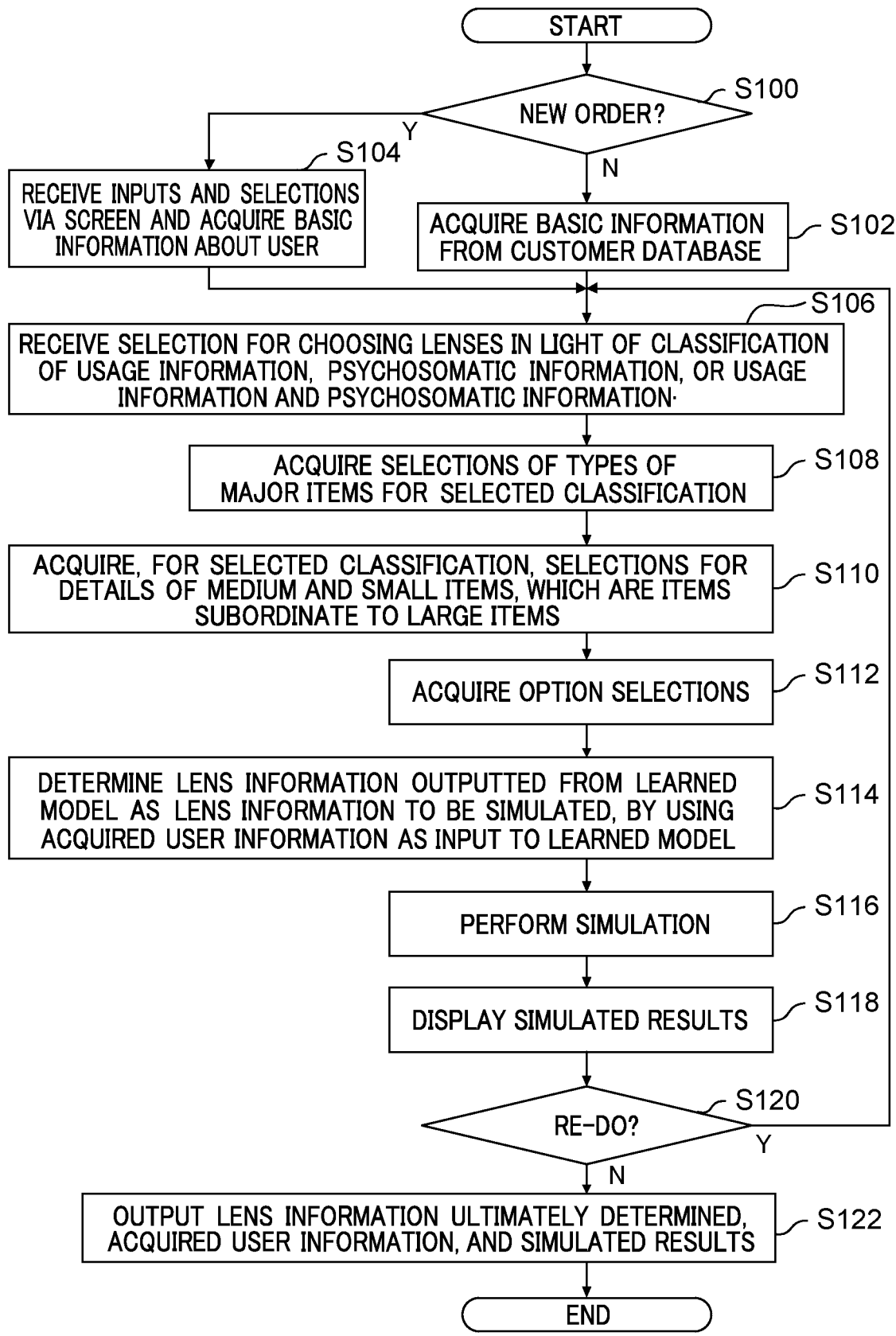
FIG. 12 is a diagram illustrating an example of a processing routine that is executed by the lens ordering device according to the first embodiment.

FIG. 12 is a diagram illustrating an example of a processing routine that is executed by the lens ordering device 10. The action of the lens ordering device 10 will be described with reference to FIG. 12.

In step S100, the acquisition unit 28 receives a request to order lenses for a user and determines whether or not the order is a new order. The determination of whether or not the order is a new order is made by referring to the customer database in the data storage unit 22. In the case of a new order, the processing moves to step S102. When not a new order, the processing moves to step S104.

In step S102, the acquisition unit 28 refers to the basic information about the user from the customer database in the data storage unit 22.

In step S104, the acquisition unit 28 acquires the basic information about the user by receiving inputs and selections via interface screens for acquiring the basic information.

In step S106, the acquisition unit 28 receives a selection for choosing lenses in light of a user information classification, namely, usage information, psychosomatic information, or usage information and psychosomatic information. The selection of the classification is received via the interface screen illustrated in FIG. 4 above.

In step S108, the acquisition unit 28 acquires selections of types of major items for the selected classification. The major items are acquired via the interface screen illustrated in FIG. 5. When the classification of usage information and psychosomatic information is selected, each of these information items are acquired. The same applies to the next step.

In step S110, the acquisition unit 28 acquires, for the selected classification, selections for the details of medium and small items, which are items subordinate to the large items.

In step S112, the acquisition unit 28 acquires the option selections. The options are acquired via the interface screen illustrated in FIG. 6.

In step S114, the selection unit 30 determines the lens information outputted from the learned model as the lens information to be simulated, by using the user information acquired by the acquisition unit 28 as an input to the learned model stored in the data storage unit 22.

In step S116, the selection unit 30 performs a simulation on the basis of the determined lens information.

In step S118, the display unit 32 displays the simulated results.

In step S120, the acquisition unit 28 acquires a result indicating whether the simulated results are OK or NG. In a case where the results are OK, the processing moves to step S122, and in a case where the results are NG, the processing returns to step S106, and the processing is repeated. Note that, the previous selection history may be reflected in iterations.

In step S122, the display unit 32 outputs the lens information ultimately determined by the selection unit 30, the acquired user information, and the simulated results.

As described hereinabove, the lens ordering device 10 according to the first embodiment is capable of presenting recommended lens information to the user by taking a plurality of items into account.

<System Configuration According to Second Embodiment>

Figure 13:
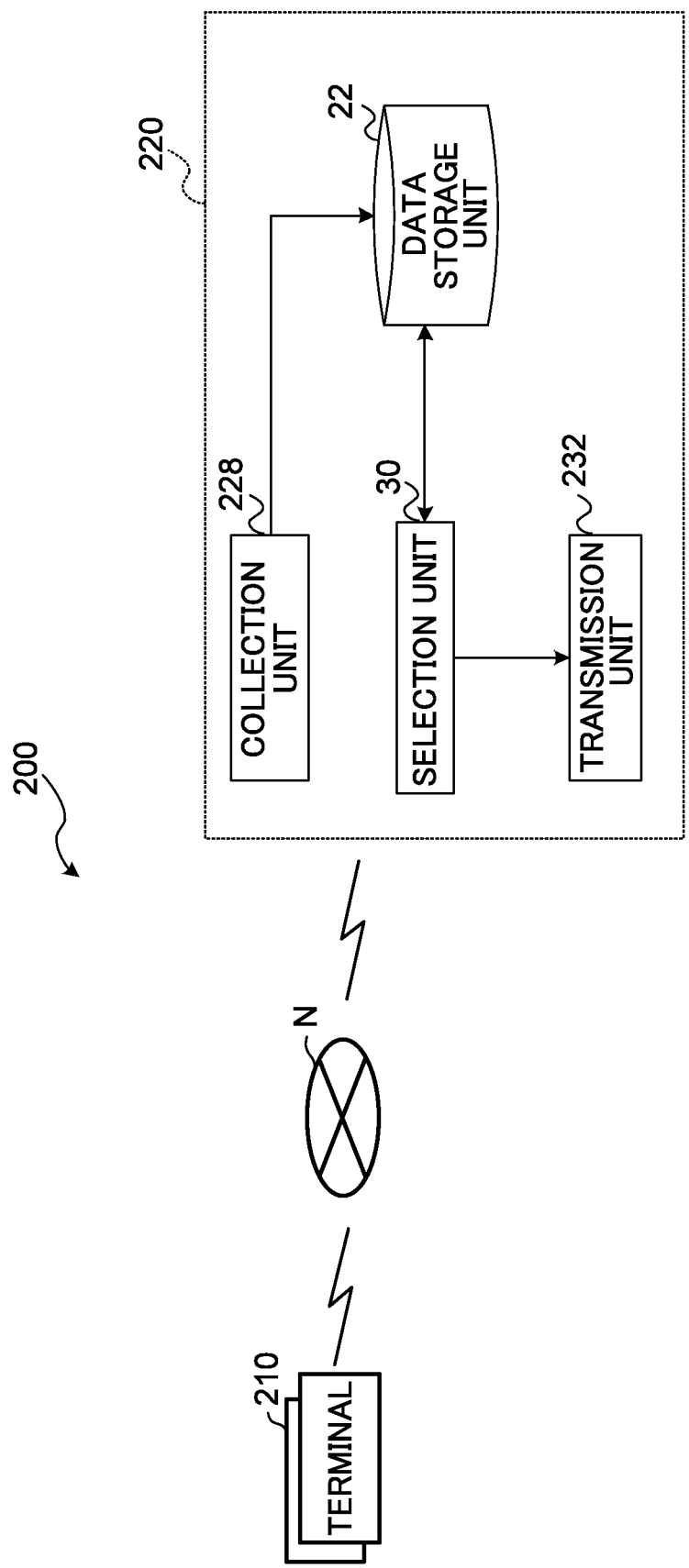
FIG. 13 is a block diagram illustrating a system configuration of a lens ordering system according to a second embodiment.

A second embodiment will now be described. FIG. 13 is a block diagram illustrating a system configuration of a lens ordering system according to a second embodiment. As illustrated in FIG. 13, in the lens ordering system 200, a plurality of terminals 210 and a lens ordering device 220 are connected via a network N. In comparison with the lens ordering device 10 according to the above-described first embodiment, the second embodiment differs in that user information is collected for each user by a collection unit 228, and in that the lens information is presented to the terminal 210.

The terminal 210 can be smartphone terminal owned by a user, or a tablet terminal assigned to a store that sells eyeglasses, or the like. The terminal 210 has an interface similar to the acquisition unit 28 and the display unit 32 according to the first embodiment. The interface is used to acquire each of the user information, namely the basic information, and at least one of the usage information and psychosomatic information. The interface is also used to display the lens information received from the lens ordering device 220. The terminal 210 transmits, to the lens ordering device 220, the user information together with identification information which is assigned to the terminal 210 for each acquisition. The identification information is identification information for the relevant terminal 210 and identification information for the user who acquired the information.

The collection unit 228 of the lens ordering device 220 collects, from each of the terminals 210, identification information for the terminal 210 and the respective user information—namely the basic information and at least one of the usage information or psychosomatic information—and stores, for each identification information item, the respective user information—namely the basic information and the usage information and psychosomatic information—in the data storage unit 22. The selection unit 30 determines the lens information recommended for the user by the same processing as in the first embodiment for each identification information item stored in the data storage unit 22. The transmission unit 232 transmits the lens information determined for the identification information to the terminal 210 to which the identification information is assigned.

<Action According to Second Embodiment>

Figure 14:
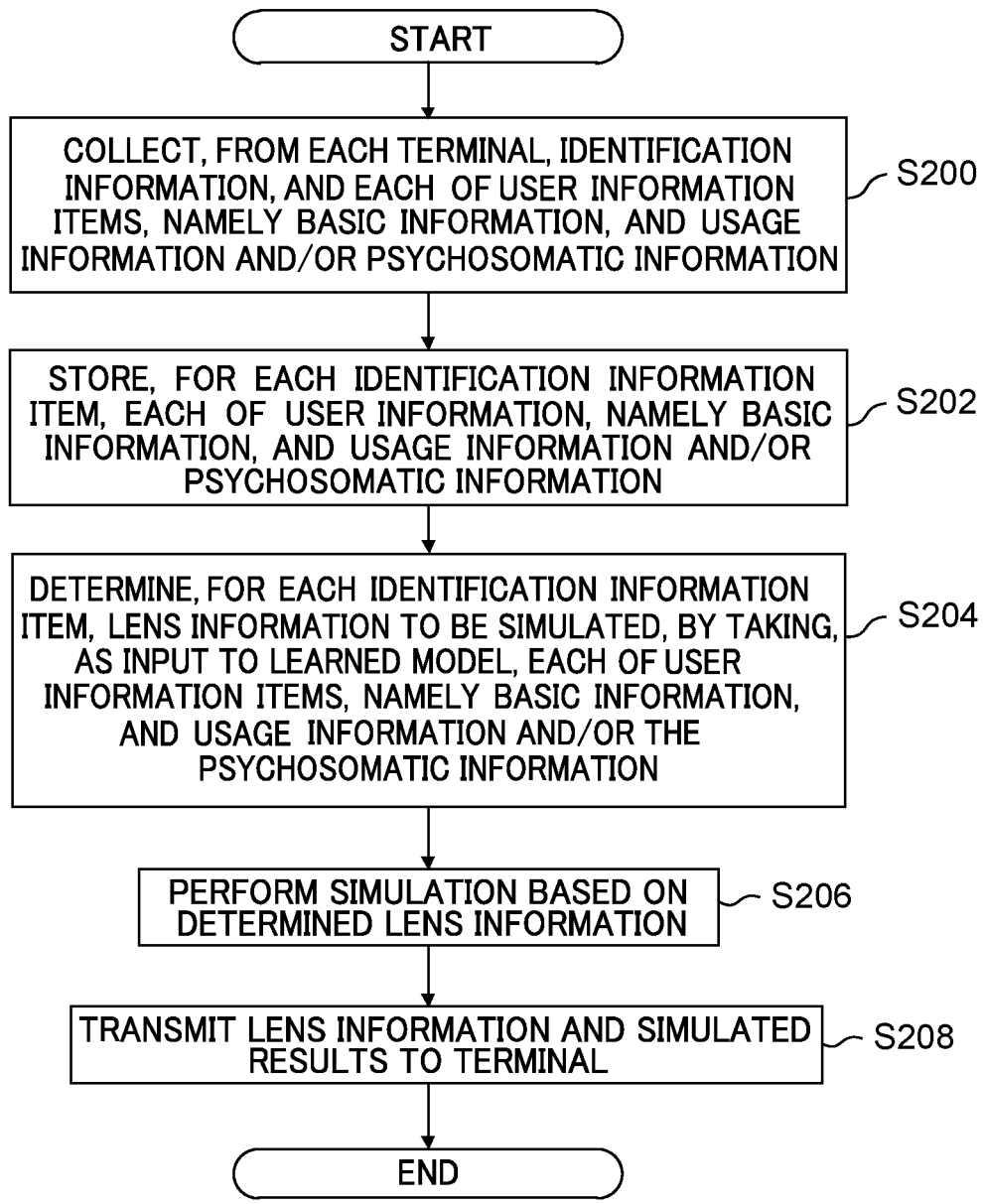
FIG. 14 is a diagram illustrating an example of a processing routine that is executed by a lens ordering device according to the second embodiment.

FIG. 14 is a diagram illustrating an example of a processing routine that is executed by the lens ordering device according to the second embodiment. The action of the lens ordering device 220 will be described with reference to FIG. 14. Note that the terminal 210 performs the same processing as in the above-described steps S102 to S112. Furthermore, in a case where the simulated results are received and the user information is to be re-inputted once again, the transmission may be carried out using the same processing.

In step S200, the collection unit 228 collects, from each of the terminals 210, the identification information for the terminal 210 and each of the user information, namely the basic information, the usage information, and the psychosomatic information.

In step S202, the collection unit 228 stores, for each identification information item, each of the user information, namely the basic information, the usage information, and the psychosomatic information, in the data storage unit 22.

In step S204, the selection unit 30 determines, for each identification information item stored in the data storage unit 22, the lens information outputted from the learned model as the lens information of the user of the identification information, by taking, as an input to the learned model stored in the data storage unit 22, each of the user information, namely the basic information and at least one of the usage information and the psychosomatic information. Note that the processing of step S204 may be performed at predetermined intervals (5 minutes, 10 minutes, or 20 minutes, or the like).

In step S206, the selection unit 30 performs a simulation based on the determined lens information for each identification information item stored in the data storage unit 22.

In step S208, the transmission unit 232 transmits the lens information and the simulated results determined for the user of the identification information to the terminal 210 to which the identification information is assigned.

As described hereinabove, the lens ordering system 200 according to the second embodiment makes it possible to present lens information recommended for each user by taking a plurality of items into account.

Note that the present invention is not limited to or by the above-described embodiments, rather, a variety of variations and applications are possible within a scope not departing from the spirit of the invention.

For example, a case where the simulated results by the selection unit according to the above-described embodiment are displayed on the lens ordering device or the terminal has been described, but the present invention is not limited thereto. For example, the simulated results may also be displayed using techniques such as drawing a 3D model of eyeglasses based on the lens information in a virtual space using VR (Virtual Reality), or drawing eyeglasses based on the lens information as virtual eyeglasses in a real space using an AR (Augmented Reality) technique.

Furthermore, for example, display control and access control may be established for the determined lens information for external lens processors, such that the information is only partially disclosed for some of the data in the lens information.

Moreover, although an embodiment in which a program is pre-installed has been described in the present specification, it is also possible to provide the program by storing same on a computer-readable recording medium.

The disclosure of Japanese Patent Application No. 2019-047275, filed on Mar. 14, 2019, is incorporated herein by reference in its entirety.

All documents, patent applications, and technical standards disclosed in the present specification are incorporated herein by reference to the same extent as if the individual documents, patent applications, and technical standards were specifically and individually marked as being incorporated by reference.

The invention claimed is:

1. A lens ordering system, comprising:
a computer, the computer being provided with a CPU and a storage unit, and functioning as an acquisition unit and a selection unit that are configured to be controlled by the CPU, wherein:
the storage unit stores a learned model configured to output lens information of color lenses using user information as input,
the user information includes basic information about a user, usage information pertaining to lens usage regarding the use of the colored lens desired by the user, and psychosomatic information indicating symptoms and conditions of the body and mind of the user, including the eyes of the user,
the acquisition unit acquires at least one of usage information or psychosomatic information serving as the user information, via an input from a user, while transitioning through interface screens in a predetermined order, respectively,
the selection unit uses the user information acquired about the user as input to the learned model, determines the lens information based on the output from the learned model, and outputs it to a display unit,
the lens information includes a resin material type, a pigment type, and a coating type that are used for a lens material,
the lens information further includes information about lens staining properties, and information about resin solubility, which indicates the compatibility of a specific pigment with a specific resin,
the learned model is trained in advance by using, as learning data, weights for elements of the user information, and correct answer data for elements of the lens information,
in the case of acquiring the usage information, the usage information is acquired by firstly receiving a user selection of a usage type, and secondly receiving a user selection of details for a hierarchy of selection items provided for the selected usage type, and
in the case of acquiring the psychosomatic information, the psychosomatic information is acquired by firstly receiving a user selection of a symptom type, secondly receiving a user selection of a symptom area for the selected symptom type, and thirdly receiving a user selection of related symptoms.

2. The lens ordering system according to claim 1, wherein:
the learned model that is trained is a learned model in which weighting parameters of a neural network model are defined for the elements of the user information and are learned by a deep learning technique the using, as learning data.

3. The lens ordering system according to claim 1 or 2, wherein:
the computer further includes a collection unit,
the collection unit collects, via a network, the user information pertaining to the user, which is input to a terminal, and records the user information in the storage unit.

4. A lens ordering method that causes a computer to execute processing, the computer storing a learned model that is configured to output lens information for a colored lens using user information as an input, the user information including basic information about a user, usage information regarding the use of the colored lens desired by the user, and psychosomatic information indicating symptoms and condition of the body and mind of the user, including the eyes of the user, the processing comprising:
acquiring at least one of usage information or psychosomatic information by receiving user selections of selection items via input interface screens, in a predetermined order, respectively,
inputting the user information, including the at least one of the usage information and the psychosomatic information acquired, to the learned model, determining the lens information based on the output from the learned model, and outputting the lens information to a display unit,
the lens information including a resin material type, a pigment type, and a coating type that are used for a lens material,
wherein:
the lens information further includes information about lens staining properties, and information about resin solubility, which indicates the compatibility of a specific pigment with a specific resin,
the learned model is trained in advance by using, as learning data, weights for elements of the user information, and correct answer data for elements of the lens information,
in the case of acquiring the usage information, the usage information is acquired by firstly receiving a user selection of a usage type, and secondly receiving a user selection of details for a hierarchy of selection items provided for the selected usage type, and
in the case of acquiring the psychosomatic information, the psychosomatic information is acquired by firstly receiving a user selection of a symptom type, secondly receiving a user selection of a symptom area for the selected symptom type, and thirdly receiving a user selection of related symptoms.

5. A non-transitory computer-readable storage medium storing a program that causes a computer to execute processing, the computer storing a learned model that is configured to output lens information for a colored lens using user information as an input, the user information including basic information about a user, usage information regarding the use of the colored lens desired by the user, and psychosomatic information indicating symptoms and condition of the body and mind of the user, including the eyes of the user, the processing comprising:

acquiring at least one of usage information or psychosomatic information by receiving user selections of selection items via input interface screens, in a predetermined order, respectively, inputting the user information, including the at least one of the usage information and the psychosomatic information acquired, to the learned model, determining the lens information based on the output from the learned model, and outputting the lens information to a display unit, the lens information including a resin material type, a pigment type, and a coating type that are used for a lens material, wherein:

the lens information further includes information about lens staining properties, and information about resin solubility, which indicates the compatibility of a specific pigment with a specific resin, the learned model is trained in advance by using, as learning data, weights for elements of the user information, and correct answer data for elements of the lens information, in the case of acquiring the usage information, the usage information is acquired by firstly receiving a user selection of a usage type, and secondly receiving a user selection of details for a hierarchy of selection items provided for the selected usage type, and in the case of acquiring the psychosomatic information, the psychosomatic information is acquired by firstly receiving a user selection of a symptom type, secondly receiving a user selection of a symptom area for the selected symptom type, and thirdly receiving a user selection of related symptoms.

6. A non-transitory computer-readable storage medium storing a data structure that includes user information and that is used by a lens ordering system, the lens ordering system comprising a computer, the computer being provided with a CPU and a storage unit, and functioning as an acquisition unit and a selection unit that are configured to be controlled by the CPU the storage unit stores a learned model configured to output lens information for a colored lens using user information as an input, the data structure including the user information, wherein the user information includes basic information about a user, usage information regarding the use of the colored lens desired by the user, and psychosomatic information indicating symptoms and conditions of the body and mind of the user, including the eyes of the user, the acquisition unit acquires at least one of usage information or psychosomatic information serving as the user information, via an input from a user, while transitioning through interface screens in a predetermined order, respectively, the selection unit uses the user information acquired about the user as input to the learned model, determines the lens information based on the output from the learned model, and outputs it to a display unit, the lens information includes a resin material type, a pigment type, and a coating type that are used for a lens material, the lens information further includes information about lens staining properties, and information about resin solubility, which indicates the compatibility of a specific pigment with a specific resin the learned model is trained in advance by using, as learning data, weights for elements of the user information, and correct answer data for elements of the lens information, in the case of acquiring the usage information, the usage information is acquired by firstly receiving a user selection of a usage type, and secondly receiving a user selection of details for a hierarchy of selection items provided for the selected usage type, and in the case of acquiring the psychosomatic information, the psychosomatic information is acquired by firstly receiving a user selection of a symptom type, secondly receiving a user selection of a symptom area for the selected symptom type, and thirdly receiving a user selection of related symptoms.

* * * * *